Sept. 27, 1932.  E. F. HATHORN  1,880,134
ADJUSTABLE SHAFT LIFT
Filed June 16, 1931
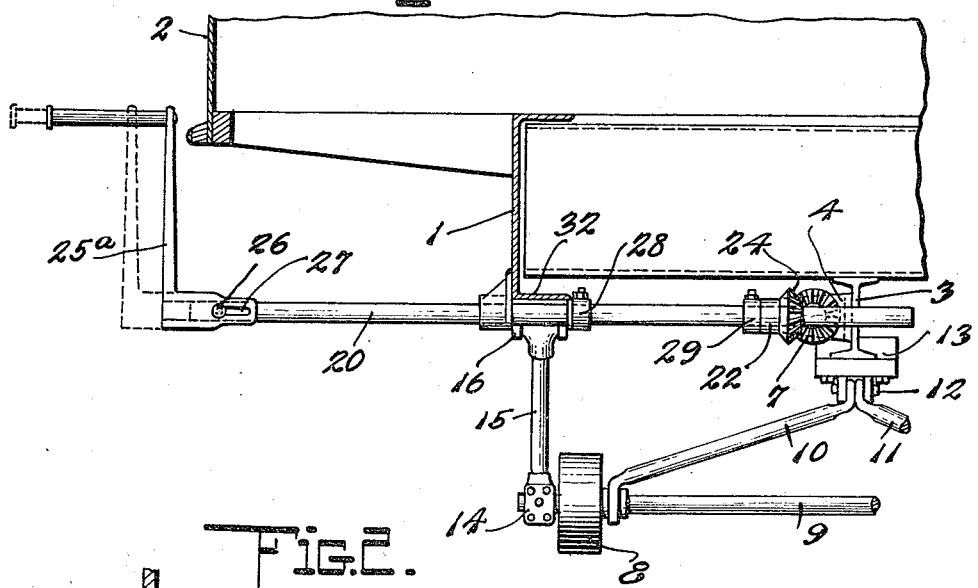
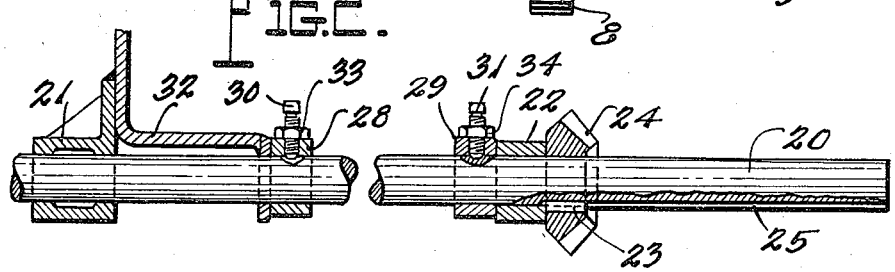
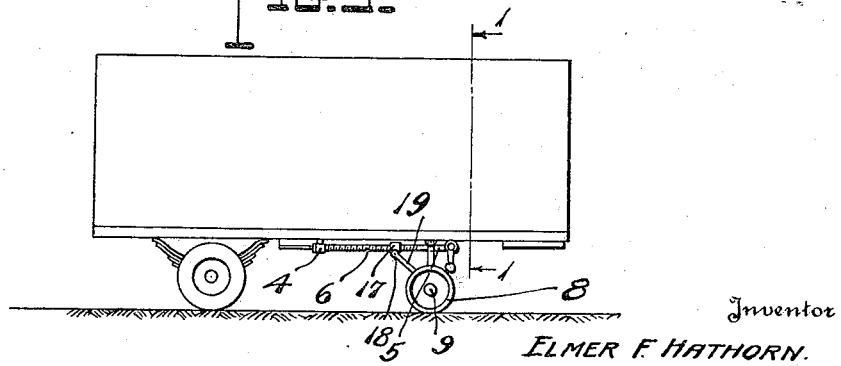
Inventor
ELMER F. HATHORN.
By Robb & Robb
Attorneys Patented Sept. 27, 1932

1,880,134

UNITED STATES PATENT OFFICE

ELMER F. HATHORN, OF EDGERTON, WISCONSIN, ASSIGNOR TO HIGHWAY TRAILER COMPANY, OF EDGERTON, WISCONSIN

ADJUSTABLE SHAFT LIFT

Application filed June 16, 1931. Serial No. 544,905.

In the construction of trailers adapted to be connected with a traction vehicle and forming the pay load therefor, it is customary to provide a wheeled support for the front of the trailer operative when the trailer is disconnected from its traction vehicle. In the so-called "automatic" type of trailer, this wheeled support is automatically moved from operative to inoperative position when the trailer is coupled to the traction vehicle and automatically returned to inoperative position when the trailer is uncoupled from the traction vehicle.

In the so-called "semi-automatic" type of trailer, the wheeled support is moved through manually operated devices. This wheeled support is hingedly mounted on the frame or chassis of the trailer and the devices for moving the support include a threaded geared shaft extending longitudinally of the trailer and operating the wheeled support, and a second shaft extending transversely of the trailer and provided with a gear in mesh with the gear of the threaded shaft. The transverse shaft is supplied with a handle adjacent the body of the trailer, the turning of which handle by an operator actuates the shafts above mentioned for movement of the support; of course suitable bearings for the shafts are secured to the trailer chassis for supporting the shafts.

It is, however, sometimes desirable to mount bodies of different widths upon a given chassis. This, however, renders the operating devices for the support difficultly operable, or inconvenient, since it is desirable to have the operating handle projecting not substantially beyond the side of the body. This means, therefore, that a transverse shaft of length suitable for a wide body would be too long for a narrower body, and a shaft of suitable length for a narrower body would be inoperative in the event that a wider body were mounted upon the chassis, since such a wide body would render the operating handle inoperative.

To overcome this disadvantage, the present invention embraces means for rendering adjustable the effective length of the transverse shaft, so that either a wide or narrow body may be mounted upon the chassis without interfering with the operation of the support.

The invention will be more readily understood by reference to the accompanying drawing, in which Figure 1 is a fragmentary vertical sectional view through the front of a trailer equipped with the present invention, the view being taken approximately on the line 1—1 of Figure 3.

Figure 2 is a fragmentary detailed view of a portion of the transverse operating shaft, and Figure 3 is a diagrammatic side elevation of a trailer embracing the present improvements.

Referring more particularly to the drawing, 1 indicates the chassis frame of the trailer upon which is mounted the body 2. Extending longitudinally beneath the body 1 is an I-beam 3 carrying brackets 4 in which operates a shaft 5, threaded as indicated at 6 and provided with a gear 7 at the forward end thereof.

The wheeled support for the tractor embraces the wheels 8 mounted on axle 9, and the standards 10 and 11 which are hinged at 12 to the member 13 carried by the I-beam 3. Each end of the axle 9 operates in a bearing 14 formed at the end of the standard 15 which is hingedly connected at 16 to the chassis frame 1.

Operating on the threads 6 is the member 17 which has hingedly connected to it at 18 the standard 19 which is also connected to the axle 9. As the member 17 travels along the threads 6 as the shaft 5 rotates, the wheels 8 will be correspondingly moved to operative or inoperative position.

For operating the shaft 5 there is provided the shaft 20 extending transversely of the trailer. This shaft operates in bearings 21 and 22, the bearing 21 being carried by the chassis frame 1 and the bearing 22 is carried by the bracket 4. The shaft 5 has keyed to it, as indicated at 23, the gear 24 which meshes with the gear 7 of the shaft 5. The shaft 20 is slotted for a substantial portion of its length as indicated at 25, the key 23 operating in this slot, which accordingly permits the shaft 20 to be moved inwardly or outwardly with respect to the body 2, while the key permits rotation of the gear 24 in any position of adjustment of the shaft 20; in other words, the slot 25 permits the shaft 20 to slip through the gear 24 without disturbing the engagement of the gear 24 with the gear 7, while always rotation of the shaft 20 will cause rotation of the gear 24 with corresponding actuation of gear 7 and shaft 5 to produce movement of the wheeled support. For imparting rotation of the shaft 20 there is provided the handle 25, rotation of which handle by an operator rotates the shaft 20 through engagement of the pin 26 with the sides of the slot 27 in the handle member. The adjustment of the shaft 20 is indicated by the dotted lines in Figure 1.

For controlling the adjustment of the shaft 20, there are provided a pair of clamping members 28 and 29, which are adapted to be clamped in position, through operation of the set screws 30 and 31. Since the clamp 28 bears against the fixed bracket 32, which in effect is a part of the chassis frame 1, and the clamp 29 bears against the fixed bracket 22, it will be apparent that, when the screws 30 and 31 are in clamping engagement with the shaft 20, longitudinal movement of the shaft is effectively prevented. To hold the screws 30 and 31 in adjustment, the jam nuts 33 and 34 are provided.

It will be apparent therefore, that the present construction embraces a means for providing adjustment of the actuating devices for the wheeled support of a semi-automatic trailer so that a body of the desired width may be mounted upon the chassis without interference with the operation of these actuating devices. It will also be apparent that modification of the details of the herein specifically illustrated and described form of the invention may be made without departing from the underlying inventive concept, and that such modifications will readily suggest themselves to one skilled in the art to which this invention relates; it will be accordingly understood that it is intended and desired to embrace within the scope of this invention such modifications and changes as may be required to adapt it to varying conditions and uses.

Having thus described my invention, what I claim as new and desire to secure by Letters Patent of the United States, is—

1. A device of the character described, comprising instrumentalities for moving the usual support for a trailer chassis into operative and inoperative positions, the said instrumentalities comprising a shaft extending transversely of the chassis, an operating handle upon the shaft, a gear splined to the shaft, and means for adjusting the position of the shaft relatively to the chassis without disturbing the position of the gear, the said means comprising an elongated key carrying the gear, an elongated groove in the shaft, the groove enabling the shaft to slide relatively to the gear, and means passing through the key for interlocking with the shaft to releasably secure it in any desired position of adjustment for positioning the operating handle out of obstructing relation with bodies of different widths mounted on the chassis, whereby the shafts are freely operable irrespective of the width of the vehicle body on the chassis.

2. A device of the character described, comprising instrumentalities for moving the usual movable support for a trailer chassis into operative and inoperative positions, the said instrumentalities comprising a shaft operatively carrying the movable supporting member and adapted to move the supporting member therealong upon rotation of the shaft, a second shaft extending transversely of the chassis and provided with a sleeve enclosing a portion of the shaft, an operating handle for the shaft, a gear secured to the sleeve and intermeshing with a corresponding gear on the first mentioned shaft, the said sleeve being provided with releasable means adapted to engage the shaft and to rotate the sleeve and gear with the shaft, the said means when released permitting the shaft to slide through the sleeve for adjusting the position of the shaft laterally relatively to the chassis for adjustably positioning the handle to accommodate bodies of different widths mounted on the chassis.

In testimony whereof I affix my signature.

ELMER F. HATHORN.